Nov. 22, 1960  R. J. GANTHER ET AL  2,960,871
VELOCITY RESPONSIVE MEANS

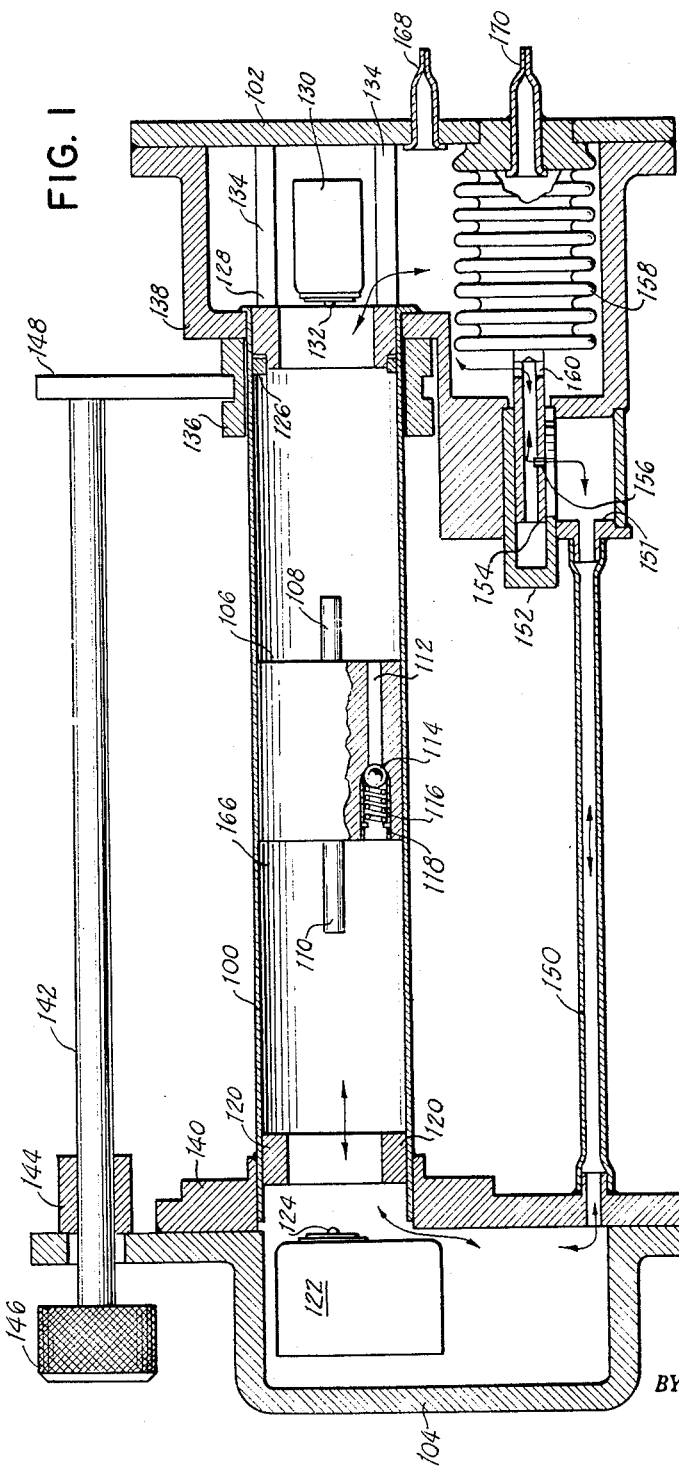

Filed May 26, 1959  2 Sheets-Sheet 2

ROBERT J. GANTHER
HENRY F. PETERSSEN
HUGH E. RIORDAN
INVENTORS

BY Andrew L. Bain
George J. Seligsohn

ATTORNEY

United States Patent Office 2,960,871
Patented Nov. 22, 1960

2,960,871

VELOCITY RESPONSIVE MEANS

Robert J. Ganther, Butler, Henry F. Peterssen, East Orange, and Hugh E. Riordan, Wyckoff, N.J., assignors to General Precision, Inc., a corporation of Delaware Filed May 26, 1959, Ser. No. 816,013

3 Claims. (Cl. 73—497)

This invention relates to velocity-responsive means and, more particularly, to a viscous-damped velocity switch.

In the operation of a moving object, such as an aircraft, a missile, a ship, etc., it is often desirable to provide a control function of some sort when the moving object has been accelerated to a predetermined velocity.

The control function itself may be initiated in response to the actuation of a switch. The problem with which the present invention is concerned is to provide relatively simple but highly accurate and reliable velocity-responsive means for actuating a switch only when the moving object has reached some predetermined velocity.

As is well known, velocity is equal to the time integral of acceleration. Furthermore, acceleration may be independently determined with a high degree of accuracy and reliability by means, such as a mass, responsive to inertial forces.

The present invention contemplates the use of a mass as an inertially responsive element which in combination with other elements provides a displacement of the mass with respect to an object which is proportional to the time integral of the acceleration of the object, i.e., the velocity of the object. By initially positioning the mass at that given distance from the switch which corresponds to the predetermined velocity at which the switch is to be actuated, the mass will be displaced from its initial position the given distance and come into contact with the switch, effecting the actuation thereof, when the moving object achieves the predetermined velocity.

It is therefore an object of this invention to provide improved velocity-responsive means.

It is another object of this invention to provide velocity-responsive means operated by inertial forces.

It is a further object of this invention to provide velocity-responsive means wherein a mass is displaced in proportion to the time integral of the acceleration of the mass with respect to an object.

It is a still further object of this invention to provide velocity-responsive means for actuating a switch in response to a predetermined velocity being achieved by a moving object.

It is a still further object of this invention to provide velocity-responsive means wherein a mass is displaced in proportion to the time integral of the acceleration of the mass with respect to a moving object and wherein a switch is actuated in response to a given displacement of the mass from an initial position.

Briefly, the invention comprises a proof mass inserted within a cylinder and having its outer surface in slidable engagement with the inner walls of the cylinder to permit axial movement of the proof mass with respect to the cylinder. The proof mass effectively divides the cylinder into two chambers, one chamber being located on one side of the proof mass and the other chamber being located on the other side of the proof mass.

Interconnecting the two chambers of the cylinder is an orifice having a very small cross-section relative to the cross-section of the cylinder. Both chambers of the cylinder and the interconnection therebetween are filled with liquid. Preferably the liquid should have a relatively high coefficient of viscosity, and a relatively small variation of viscosity with temperature, such as hydrofluorocarbon oils or silicone oils, for example.

The proof mass, which is free to move, reacts to the acceleration of the cylinder in an axial direction by pushing against the viscous liquid with an inertial force proportional to the magnitude of acceleration of the cylinder Since the viscous liquid is virtually incompressible, the proof mass, in response to the inertial force, acts as a moving piston which pumps the liquid from one chamber of the cylinder to the other through the small orifice. However, the movement of the proof mass is opposed by the viscous friction of the liquid. The distance the proof mass moves is proportional to the applied inertial force and the time during which the force is applied, i.e., the time integral of the acceleration of the cylinder, which is equal to the velocity of the cylinder.

Viscous damping is accomplished by the flow of the viscous liquid through the orifice. The orifice is designed to provide laminar flow for all velocities of proof mass. Since the cross-section of the orifice is very small compared to the cross-section of the cylinder, the drag force on the face of the proof mass will be negligible because of the low relative velocity between the face of the proof mass and the liquid. However, the velocity of the liquid through the relatively very small orifice will be high enough to provide the viscous damping required.

By inserting a switch in the path of the proof mass, the switch will be actuated by the displacement of the movable proof mass from a preset initial position to a final position in contact with the switch.

Since the proof mass is encased in a cylinder filled with liquid, it is not feasible to directly move the proof mass back to its initial position. It is therefore a feature of this invention to provide simple remote control means for quickly moving the proof mass back to its initial position and monitoring the fact that the proof mass is actually located in its initial position.

Since the cylinder may be subject to minor spurious acceleration and vibration forces in an axial direction when the proof mass is in its initial position, it is another feature of this invention to provide means for preventing the proof mass from responding to such spurious forces. In order to simplify the structure, a portion of the remote control means is also used to accomplish this purpose, and thus performs a dual function.

Since the damping of the viscous-damped velocity switch depends upon the viscosity of the liquid which changes with temperature, it is a further feature of this invention to include automatic temperature compensating means for maintaining the damping essentially constant despite temperature-induced changes in the viscosity of the liquid.

These and other attendant objects, features and advantages of the present invention will become apparent from the following detailed description of the invention taken together with the accompanying drawing, in which:

Fig. 1 is an elevation cross-section of a preferred embodiment of the invention, showing the proof mass located intermediate its initial and final positions;

Figure 1B:
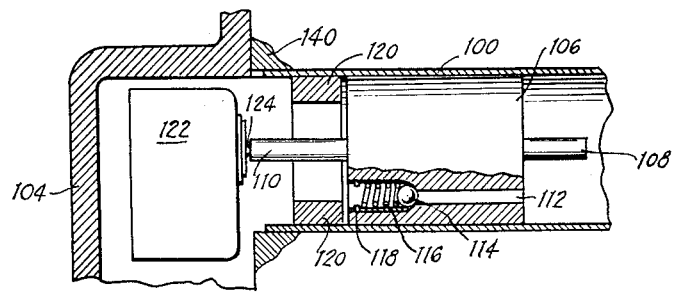
Fig. 1B is a fragmentary portion of the left side of Fig. 1, showing the proof mass located in its final position.

Referring now to Fig. 1, there is shown a cylinder 100 lying between end members 102 and 104, and having one end thereof secured to end member 102 and the other end thereof secured to end member 104.

Inserted within cylinder 100 is proof mass 106 which has its outer surface is slidable engagement with the inner wall of cylinder 100 to permit axial movement of proof mass 106 with respect to cylinder 100. Proof mass 106 is composed of a magnetic material.

Protruding from the right face of proof mass 106 is axial rod 108 and protruding from the left face of proof mass 106 is axial rod 110. As shown, proof mass 106 has a hole 112 therethrough extending parallel to the axis of cylinder 100 between the left and right faces of proof mass 106. Hole 112 is normally maintained closed by a check valve composed of ball 114, spring 116 and stop 118.

Located, as shown, at the left end of cylinder 100 is a stop magnet 120, which is fixedly secured to the inner wall of cylinder 100. Located within end member 104 in proximity to the left end of cylinder 100 is main switch 122 having an actuating button 124 lying on the axis of cylinder 100.

Located, as shown, at the right end of cylinder 100 are stop 126 and soft iron pole piece 128, both of which are fixedly secured to the inner wall of cylinder 100. Located within end member 102 in proximity to the right end of cylinder 100 is monitoring switch 130 having an actuating button 132 lying on the axis of cylinder 100. To compensate for variation in the strength of restraining and reset magnet 136 with changes in temperature, zinc compensating rods 134 are connected between soft iron pole piece 128 and end member 102, as shown.

Restraining and reset magnet 136 is in close proximity to cylinder 100 and is in slidable engagement with the outer wall thereof to permit axial movement of restraining and reset magnet 136 with respect to cylinder 100. Stop member 138, attached to end member 102, and stop member 140, attached to end member 104, limit the extent of travel of restraining and reset magnet 136. Means for moving restraining and reset magnet 136 consists of reset rod 142, which is supported by bearing member 144 attached to end member 104. As shown, reset rod 142 has a reset knob 146 attached to the left end thereof and a coupling member 148 attached to the right end thereof. Coupling member 148, as shown, extends into a groove in restraining and reset magnet 136, so that restraining and reset magnet 136 is caused to travel to the left when reset knob 146 is pulled to the left and is caused to travel to the right when reset knob 146 is pushed to the right.

Interconnecting end member 104 with end member 102 is tube 150, reservoir 151 and telescopically disposed tubular members 152 and 154 which incorporate an adjustable orifice 156. As shown, tubular member 152 is fixedly secured to end member 102 and tubular member 154 is secured to the free end of helium-filled bellows 158. Bellows 158 may be filled with another gas, rather than helium, or, instead, it may be spring-loaded. The other end of bellows 158 is fixedly secured to end member 102. As shown, tubular member 154 has a transverse hole 160 therethrough in proximity to the connection of tubular member 154 to bellows 158.

Figure 2:
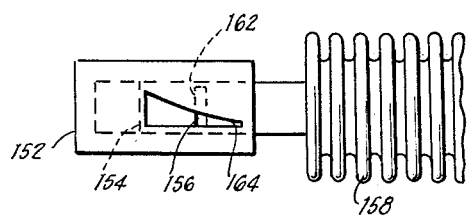
Fig. 2 is a diagrammatic detail showing of the adjustable orifice of Fig. 1.

The details of adjustable orifice 156 are shown in diagrammatic form in Fig. 2. Referring now to Fig. 2, a slit 162, which, as shown, is relatively narrow in the axial direction and relatively long in the transverse direction is cut out of the wall of tubular member 154. Tubular member 152 includes cam-shaped cutout 164 in the wall thereof which has a dimension in the transverse direction which varies, as shown, from a value at the right which is small relative to the length of slit 162 to a value at the left which is approximately equal to the length of slit 162. Therefore, the effective area of orifice 156, which comprises the portions of slit 162 and cam-shaped cut-out 164 which overlap, depends upon the relative position of tubular member 154 with respect to tubular member 152. Although not shown, the same result may be obtained by providing slit 162 in tubular member 152, rather than 154, and providing cam-shaped cutout 164 in tubular member 154, rather than 152. However, in this case the longer dimension in the transverse direction of cam-shaped cutout 164 would be located at the right, rather than the left, since the movement of cam-shaped portion 164 relative to slit 162 would be in the opposite direction.

Cylinder 100, end member 102 and 104, tube 150, reservoir 151 and tubular members 152 and 154 are completely filled with a viscous liquid 166. This viscous liquid is inserted through pinch tube 168 during the construction of the device, and then pinch tube 168 is hermetically sealed.

The helium within bellows 158 is introduced through pinch tube 170 during the construction of the device and then pinch tube 170 is hermetically sealed.

Figure 1A:
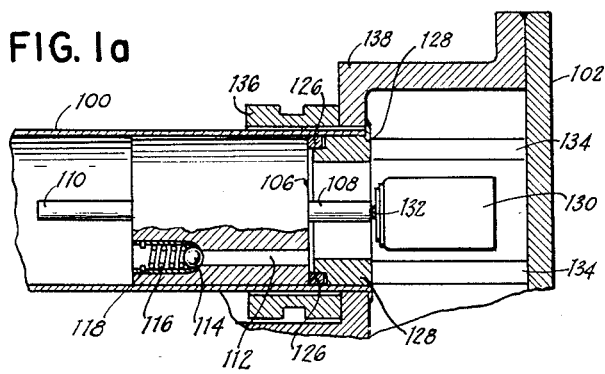
Fig. 1A is a fragmentary portion of the right side of Fig. 1, showing the proof mass located in its initial position.

Referring now to the operation of the disclosed viscous-damped velocity switch, proof mass 106 is initially positioned at the extreme right end of cylinder 100, with the right face thereof in contact with stop 126, as shown in Fig. 1A. In this initial position, actuating button 132 of monitoring switch 130 is depressed by axial rod 108 which is in engagement therewith. In response thereto, monitoring switch 130 provides a signal indicating that proof mass 106 is in its initial position.

In the initial position shown in Fig. 1A, a low reluctance flux path for restraining and reset magnet 136, which is positioned as shown in Fig. 1A in butting relationship with stop member 138, is provided through proof mass 106, stop 126 and soft iron pole piece 128. This results in a relatively high intensity magnetic holding force acting on proof mass 106. This holding force is sufficient to render proof mass 106 insensitive to spurious minor vibration and acceleration forces it may encounter in its initial position.

In response to the movement of the device in a direction from left to right with an acceleration greater than some given threshold value, a proportionate inertial force greater than the restraining force of magnet 136 will cause proof mass 106 to move to the left relative to cylinder 100. This will result in breaking the contact between proof mass 106 and stop 126 and in disengaging axial rod 108 from actuating button 132 of monitoring switch 130. The break in contact between proof mass 106 and stop 126 causes a large rise in the reluctance of the flux path, thereby effectively eliminating the restraining force of magnet 136 on proof mass 106. The disengagement of axial rod 108 from actuating button 132 of monitoring switch 130 provides a signal indicating that the proof mass 106 has moved from its initial position.

During movement of proof mass 106 to the left, ball 114 of the check valve maintains hole 112 closed. Therefore, movement of proof mass 106 is opposed by contained liquid 166. Proof mass 106 thus acts like a piston, pumping liquid 166 through orifice 156 at a rate of flow which is determined by the inertial force provided by proof mass 106, the area of orifice 156 and the viscosity of contained liquid 166.

Since the viscosity of contained liquid 166 varies with temperature, it is necessary to adjust the area of orifice in a manner which compensates for such variation in viscosity. This is accomplished by bellows 158. Should the temperature rise, for instance, the viscosity of contained liquid 166 will become lower tending to increase the rate of flow thereof through orifice 156. However, simultaneously, the rise in temperature will cause contained liquid 166 to expand. Since liquid 166 is virtually incompressible, the expansion thereof will cause bellows 158 to contract until the outside liquid pressure and the inside gas pressure, or spring force if a spring-loaded bellows is used, are in equilibrium. The contraction of bellows 158 results in moving tubular member 154 and slit 162 thereof to the right relative to cam-shaped cutout 164. As can be seen from Fig. 2, this has the effect of reducing the area of orifice 156. The curvature of cam-shaped cutout 164 is such that any change in rate of flow of liquid 166 due to variation in the viscosity of liquid 166 in response to temperature change is just counteracted by a compensating change in the area of orifice 156.

Therefore, regardless of temperature changes, the combined effect of the area of orifice 156 and the viscosity on the rate of flow of contained liquid 166 is constant. Thus, the rate of flow of contained liquid 166 is proportional solely to the inertial force exerted by proof mass 106. Since liquid 166 is virtually incompressible, movement of proof mass 106 is limited to and determined by the rate at which liquid 166 flows through orifice 156. Thus, the velocity of movement of proof mass 106 in cylinder 100 is proportional to the rate of flow of contained liquid 166, which, in turn, is proportional to the inertial force exerted by proof mass 106, which, in turn, is proportional to the acceleration of the device from left to right in the axial direction. Therefore, the velocity of movement of proof mass 106 is proportional to the acceleration of the device.

Since the cross-section of proof mass 106 is very large compared to the cross-section of orifice 156, the velocity of proof mass 106 will be quite small. Therefore, drag force of liquid 166 on the face of proof mass 106 will be negligible.

Since the velocity of proof mass 106 is proportional to the acceleration of the device, the displacement of proof mass 106 from its initial position is proportional to the velocity of the device. At some predetermined velocity of the device, determined by the length of cylinder 100, proof mass 106 will be oriented in such close proximity to stop magnet 102 that the magnetic field or stop magnet 120 will be of sufficient intensity to pull quickly proof mass 106 home to its final position, shown in Fig. 1B, in which the left face of proof mass 106 is in contact with stop magnet 100. In this final position, actuating button 124 of main switch 122 is depressed by axial rod 110 which is brought positively into engagement therewith when proof mass 106 is pulled quickly to its home position by stop magnet 120. This results in crisp operation of main switch 122. In response to the operation of main switch 122, a control signal is produced which indicates that the predetermined velocity has been achieved.

Since the accuracy of the device is dependent upon the strength of the restraining magnet 136 remaining constant, zinc compensating rods 134 are provided to change the length of the air gap in the magnetic circuit in such a way as to compensate for the variation in holding force of restraining magnet 136 with changes in temperature.

In order to return proof mass 106 from its final position to its initial position, reset knob 146 is pulled all the way to the left, thereby causing restraining and reset magnet 136 to travel the length of cylinder 100 into a position in butting relationship with stop member 140. Since proof mass 106 is now located in its final position, as shown in Fig. 1B, bringing magnet 136 into butting relationship with stop member 140, causes proof mass 106 to become flux linked with restraining and reset magnet 136, as well as with stop magnet 120. However, the magnetic strength of restraining and reset magnet 136 is considerably greater than the strength of stop magnet 120. Therefore, in response to reset knob 146 being pushed back to its original position, shown in Fig. 1, proof mass 106, which is flux linked with magnet 136, moves along with magnet 136 from left to right back to its initial position, shown in Fig. 1A.

In order to prevent contained liquid 166 from retarding the movement of proof mass from left to right during its travel back to its initial position, the check valve in proof mass 106 opens, ball 114 being pushed back by liquid 166 to compress spring 116 against stop 118, so that contained liquid 166 may readily flow through relatively large hole 112.

Although only a preferred embodiment of the invention has been described, it is not intended that the invention be restricted thereto, but that it be limited solely by the true spirit and scope of the appended claims.

We claim:

1. Velocity responsive means, comprising, in combination, a pair of end members; a cylinder thereinbetween; a proof mass in said cylinder dividing said cylinder into first and second chambers; stop means on one end member adapted to loosely engage and stop said proof mass; a switch associated with the end member having said stop means adapted to be actuated by said proof mass; restraining and reset means normally at the end of said cylinder opposite said stop means adapted to restrain said proof mass from moving towards said stop means but movable towards said stop means to reset said proof mass when said proof mass is in engagement with said stop means; tubular means interconnecting said first and second chambers; a viscous liquid sealed in said chambers and tubular means; and temperature responsive adjustable means associated with said tubular means responsive to changes in pressure of said viscous liquid impeding the passage of said viscous liquid with the lowering of the viscosity of the contained liquid.

2. Velocity responsive means, comprising in combination, a pair of end members; a cylinder thereinbetween; a proof mass in said cylinder dividing said cylinder into first and second chambers; a stop magnet on one end member adapted to loosely engage and stop said proof mass; a switch within the end member having said stop magnet adapted to be actuated by said proof mass; a restraining and reset magnet normally at the end of said cylinder opposite said stop magnet adapted to restrain said proof mass from moving towards said stop magnet but movable towards said stop magnet to reset said proof mass when said proof mass is in engagement with said stop magnet; tubular means interconnecting said first and second chambers; a viscous liquid sealed in said chambers and tubular means; and temperature responsive adjustable means associated with said tubular means responsive to changes in pressure of said viscous liquid impeding the passage of said viscous liquid with the lowering of the viscosity of the contained liquid.

3. Velocity responsive means, comprising in combination, a pair of end members; a cylinder thereinbetween; a proof mass in said cylinder dividing said cylinder into first and second chambers; a stop magnet on one end member adapted to loosely engage and stop said proof mass; a switch within the end member having said stop magnet adapted to be actuated by said proof mass; a restraining and reset magnet normally at the end of said cylinder opposite said stop magnet adapted to restrain said proof mass from moving towards said stop magnet but movable towards said stop magnet to reset said proof mass when said proof mass is in engagement with said stop magnet; tubular means interconnecting said first and second chambers; a viscous liquid sealed in said chambers and tubular means; a compressible resilient chamber associated with said tubular means; and, an adjustable mouth whose adjustment depends on the compression of said compressible resilient chamber by said viscous liquid, said mouth impeding the passage of said viscous liquid with the lowering of the viscosity of the contained liquid.

4. Velocity responsive means, comprising in combination, a pair of end mmebers; a cylinder thereinbetween; a proof mass in said cylinder dividing said cylinder into first and second chambers; actuating means protruding from said proof mass; a stop magnet on one end member adapted to loosely engage and stop said proof mass; a switch within the end member having said stop magnet adapted to be actuated by said protruding actuating means a restraining and reset magnet normally at the end of said cylinder opposite said stop magnet adapted to restrain said proof mass from moving towards said stop magnet but movable towards said stop magnet to reset said proof mass when said proof mass is in engagement with said stop magnet; a reset rod to reset said restraining and reset magnet; tubular means interconnecting said first and second chambers; a viscous liquid sealed in said chambers and tubular means; and temperature responsive adjustable means associated with said tubular means responsive to changes in pressure of said viscous liquid impeding passage of said viscous liquid with the lowering of the viscosity of the contained liquid.

5. Velocity responsive means, comprising in combination, a pair of end members; a cylinder thereinbetween; a proof mass in said cylinder dividing said cylinder into first and second chambers; actuating means protruding from said proof mass; a stop magnet on one end member adapted to loosely engage and stop said proof mass; a switch within the end member having said stop magnet adapted to be actuated by said protruding actuating means; a restraining and reset magnet normally at the end of said cylinder opposite said stop magnet adapted to restrain said proof mass from moving towards said stop magnet but movable towards said stop magnet to reset said proof mass when said proof mass is in engagement with said stop magnet; a reset rod to reset said restraining and reset magnet; tubular means interconnecting said first and second chambers; a viscous liquid sealed in said chambers and tubular means; a compressible resilient chamber associated with said tubular means; and, an adjustable mouth whose adjustment depends on the compression of said compressible resilient chamber by said viscous liquid, said mouth impeding the passage of said viscous liquid with the lowering of the viscosity of the contained liquid.

6. Velocity responsive means, comprising in combination, a pair of end members; a cylinder thereinbetween; a proof mass in said cylinder dividing said cylinder into first and second chambers; stop means on one end member adapted to loosely engage and stop said proof mass; a switch within the end member having said stop means adapted to be actuated by said proof mass; restraining and reset means normally at the end of said cylinder opposite said stop means adapted to restrain said proof mass from moving towards said stop means but movable towards said stop means to reset said proof mass when said proof mass is in engagement with said stop means; a pair of telescopically disposed tubular members, at least one of which is movable, interconnecting said first and second chambers; resilient means attached to said movable tubular member responsive to and compressible by any liquid pressure within said tubular member; an adjustable mouth in said tubular member, including an aperture and a cam-shaped member, said cam-shaped member being actuated to and fro by said resilient means, the adjustment of said mouth depending on the position of said cam in said aperture as determined by the actuation of said resilient means; and, a viscous liquid sealed in and through said cylinder and tubular members.

7. Velocity responsive means, comprising in combination, a pair of end members; a cylinder thereinbetween; a proof mass in said cylinder dividing said cylinder into first and second chambers; actuating means protruding from said proof mass; a stop magnet on one end member adapted to loosely engage and stop said proof mass; a switch within the end member having said stop magnet adapted to be actuated by said protruding actuating means a restraining and reset magnet normally at the end of said cylinder opposite said stop magnet adapted to restrain said proof mass from moving towards said stop magnet but movable towards said stop magnet to reset said proof mass when said proof mass is in engagement with said stop magnet; a pair of telescopically disposed tubular members, at least one of which is movable, interconnecting said first and second chambers; resilient means attached to said movable tubular member responsive to and compressible by any pressure within said tubular member; an adjustable mouth in said tubular member, including an aperture and a cam-shaped member, said cam shaped member being actuated to and fro by said resilient means, the adjustment of said mouth depending on the position of said cam in said aperture as determined by the actuation of said resilient means; and, a viscous liquid sealed in and through said cylinder and tubular mmebers, whereby said proof mass is normally retained by said restraining and reset magnet at the end of said cylinder opposite said stop magnet, but, upon sufficient acceleration, the force of said restraining and reset magnet holding said proof mass is overcome and said proof mass will move longitudinally along said cylinder towards the stop magnet at the rate permitted by the viscosity of said viscous liquid actuating said switch when reaching said stop magnet, said proof mass being reset by moving said reset rod along said cylinder until said restraining and reset magnet again engages said proof mass and then moving said proof mass back to its original position, any change in the viscosity of the viscous liquid due to temperature being compensated by said the adjustment of said adjustable mouth.

8. The velocity-responsive means defined in claim 7, wherein said proof mass has a hole therethrough which is parallel to the axis of said cylinder, and a check valve in said hole for maintaining said hole closed in response to movement of said proof mass in a direction away from its initial position and for maintaining said hole open in response to movement of said proof mass in a direction toward its initial position.

References Cited in the file of this patent

UNITED STATES PATENTS

| | | |
|---|---|---|
| 1,845,848 | Richards | Feb. 16, 1932 |
| 2,332,994 | Draper et al. | Oct. 26, 1943 |
| 2,342,141 | Hansen | Feb. 22, 1944 |
| 2,603,726 | McLean | July 15, 1952 |
| 2,659,589 | Hickman | Nov. 17, 1953 |
| 2,713,097 | Wooten | July 12, 1955 |
| 2,802,204 | Kennelly et al. | Aug. 6, 1957 |
| 2,854,539 | Ruppel | Sept. 30, 1958 |